Patented Jan. 3, 1939

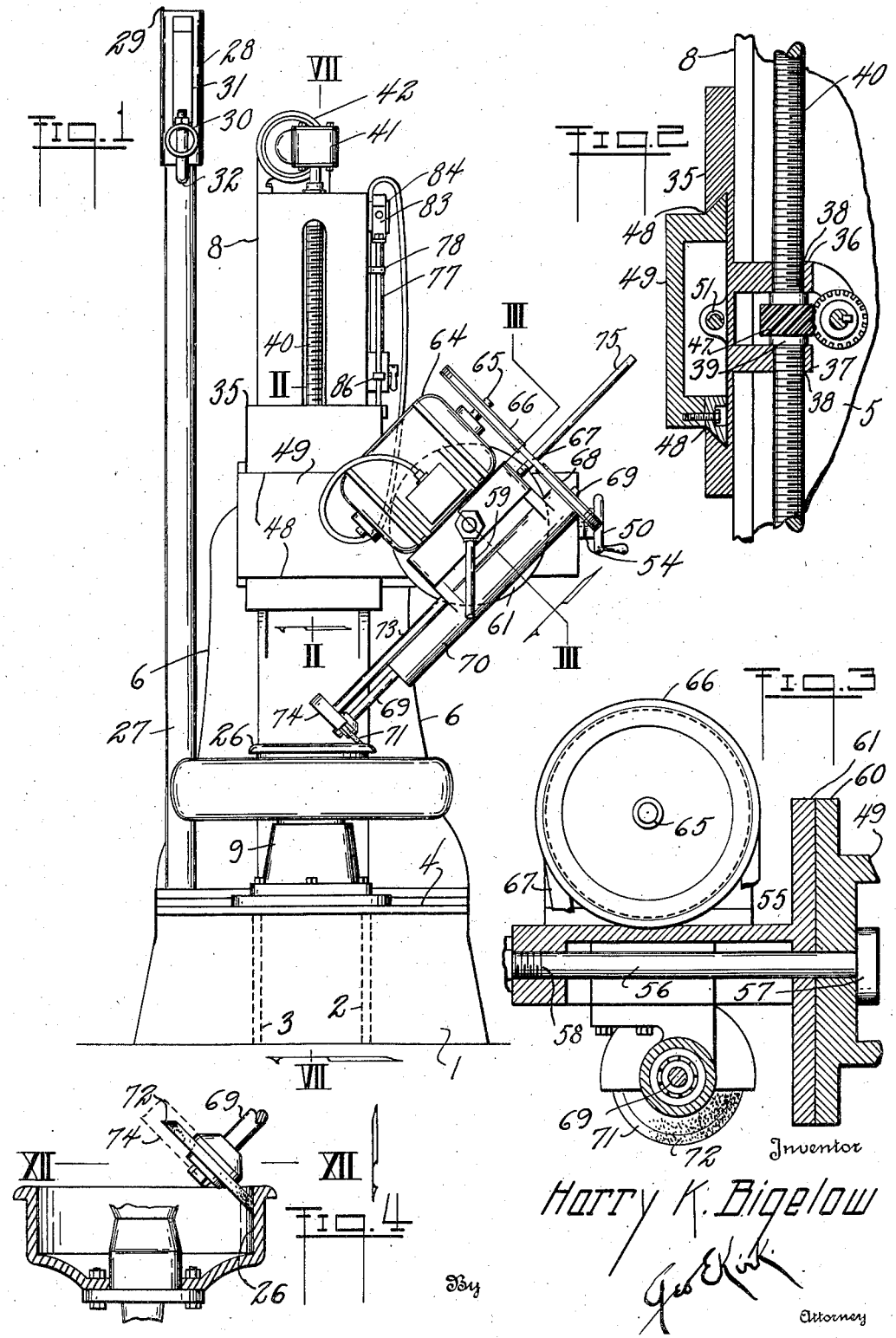

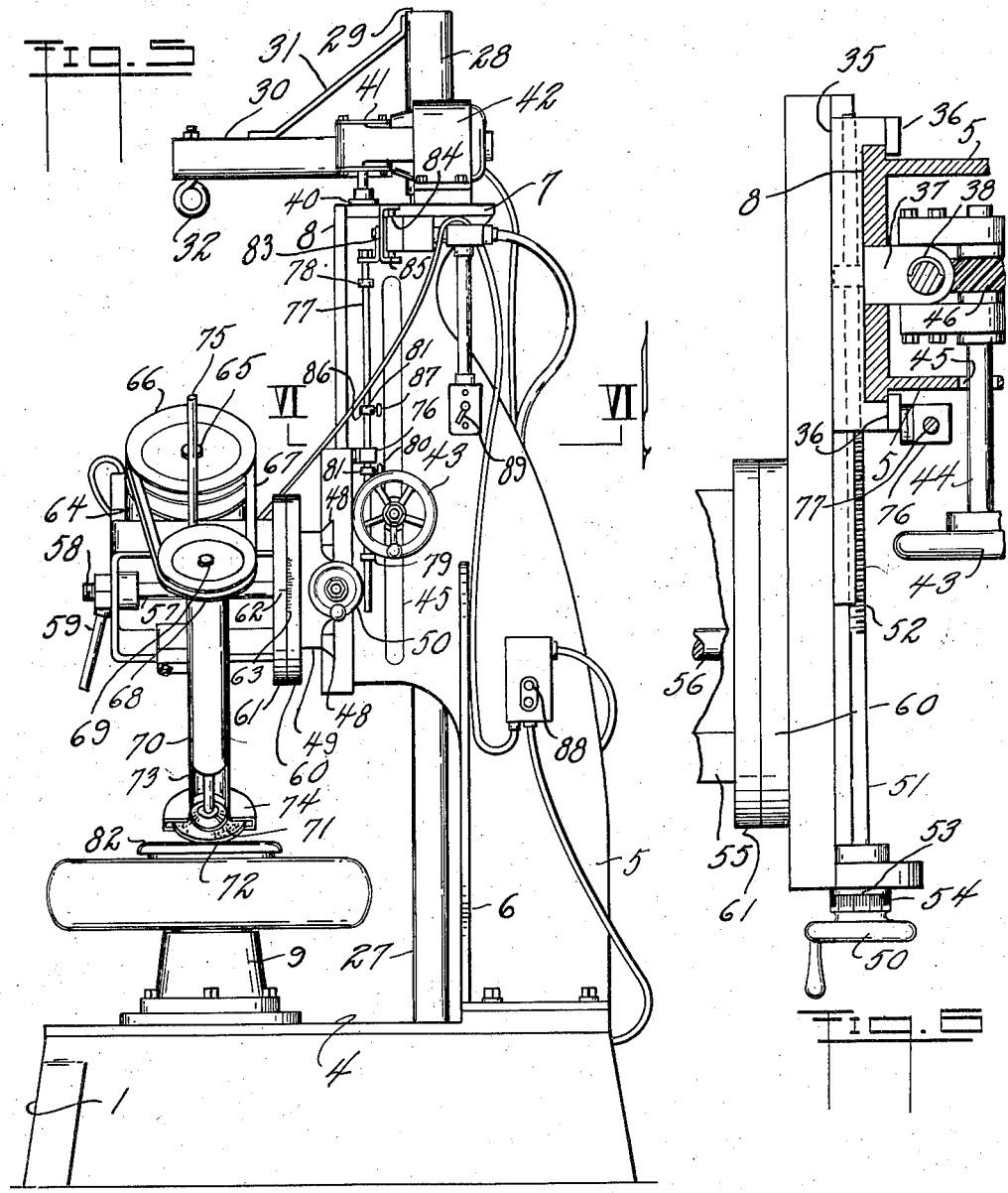

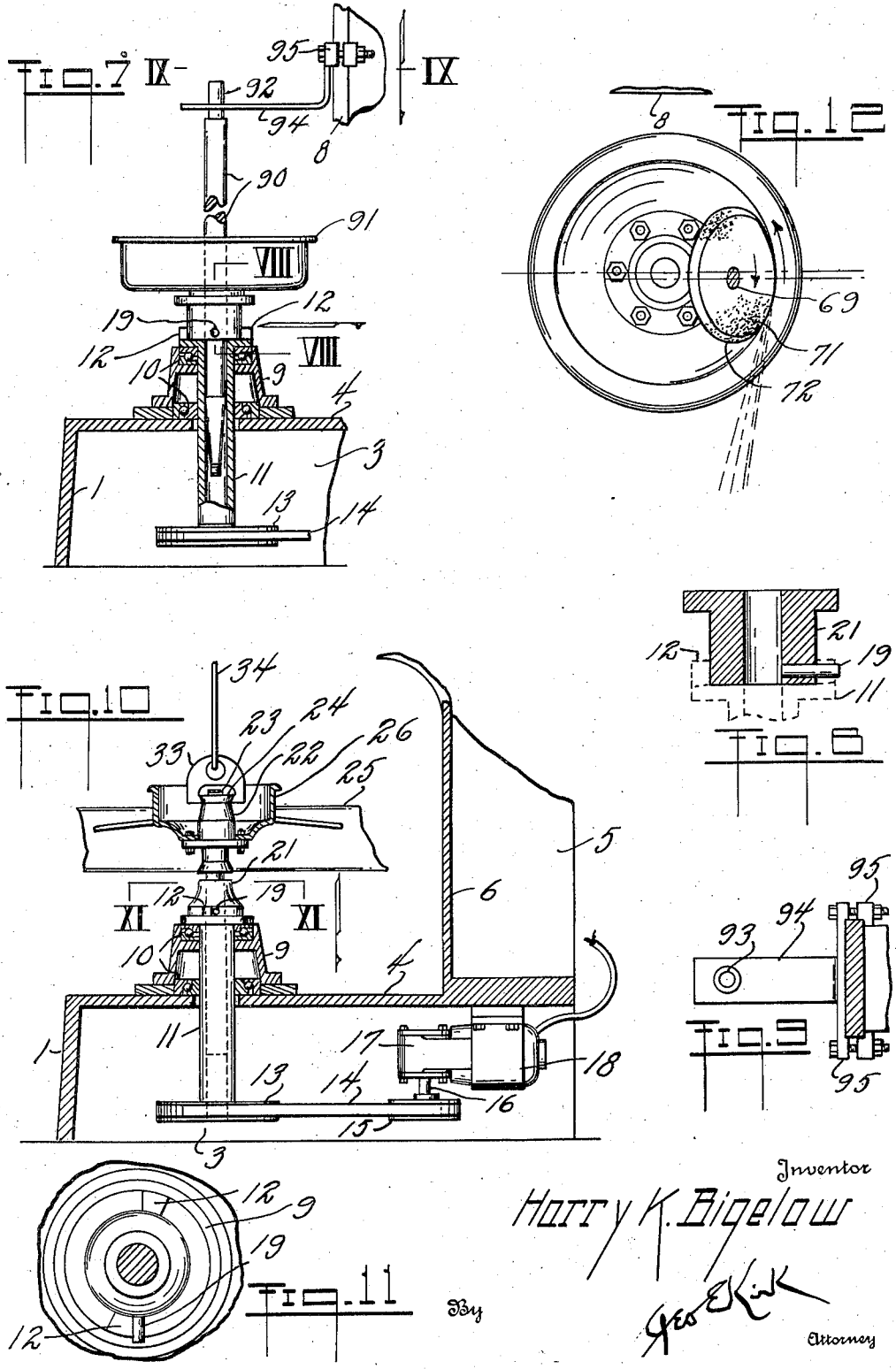

2,142,710

UNITED STATES PATENT OFFICE 2,142,710

BRAKE DRUM GRINDING

Harry K. Bigelow, Columbus, Ohio, assignor of one-half to Benjamin S. Lurie, Columbus, Ohio Application October 9, 1937, Serial No. 168,189

1 Claim. (Cl. 51—105)

This invention relates to dressing, re-dressing, and working on interior cylindrical surfaces.

This invention has utility when incorporated in re-finishing of brake drums, especially for motor vehicles and in which the brake drum action occurs on the drum interior face.

Referring to the drawings:

Fig. 1 is a front view of an embodiment of the invention in a power tool;

Fig. 2 is a section on the line II—II, Fig. 1, showing the mounting for raising and lowering the tool holder;

Fig. 3 is a section on the line III—III, Fig. 1, showing the clamp and release for rocking the tool holder;

Fig. 4 is a vertical section of a drum in position on a work holder as acted upon by the dressing or grinding tool of the tool holder;

Fig. 5 is a view of the machine of Fig. 1 from the right;

Fig. 6 is a section on the line VI—VI, Fig. 5, showing features of the assembly of the tool holder mounting with the frame;

Fig. 7 is a fragmentary view of the work holder as adapted to receive a drum mounted on an axle instead of on the wheel or hub as in the showings of Figs. 1 and 5;

Fig. 8 is a section on the line VIII—VIII, Fig. 7, showing the drive connection between the brake drum mounting and the rotary drive for the holder;

Fig. 9 is a view on the line IX—IX, Fig. 7, showing the axle holding feature or guide;

Fig. 10 is a fragmentary view showing the drive for the work holder and connections for locating the work or transferring it to or from the tool;

Fig. 11 is a section on the line XI—XI, Fig. 10, showing features of the work holder mounting; and Fig. 12 is a view on the line XII—XII, Fig. 4, showing the eccentric position for the grinding wheel as to the radius parallel to the swing and transit adjustments of the tool holder.

The power machine tool herein comprises welded plates 1 (Fig. 5) forming a rectangular base having reinforcing webs 2, 3, therein and deck 4. Rising from this deck 4 are uprights comprising parallel plates 5 mounting vertical plate 6 with cap piece 7 thereon as mounting for guide 8. On this deck 4 there is sub-base 9 providing bearings 10 (Fig. 10) mounting sleeve 11 carrying diametrical pair of radial lugs 12 above the sub-base 9. This sleeve 11, as extending below the plate 4, carries pulley 13 driven by belt 14 from pulley 15 on shaft 16 driven by speed reduction device 17 from motor 18 mounted on the plate or web 3 of the base.

The sleeve 11 having the diametrical pair of radial lugs 12 forms a seat in which may be located a substitute axle in the work holder, which as herein may have radial pin 19 on block from which rises stem 21 of axle-like form to enter hub 22 of a wheel axle and with threaded portion 23 therefrom receive nut 24, thereby clamping wheel 25 in position on this axle-like or spindle portion of the mounting in locating brake drum 26 fixed therewith coaxial with the sleeve 11.

Rising from the deck 4 by weld assembly is tubular column 27 (Fig. 1) adjacent to one side the holder guide 8. This tube 27 at its upper portion carries tube 28 having closed top 29 in providing swivel mounting for radial arm 30 having strut 31. This arm 30 at its free end carries eye 32, in which may be located hoist for connection to the substitute axle device as by eye 33 (Fig. 10) so that connection 34 therefrom on this hoist through the eye 32 is a convenient means for raising and lowering the wheel and its drum into position on the work holder. This is accordingly an effective means of transfer of the wheel and the substitute axle into position for dropping into the sleeve 11 or in removing therefrom, even in the heavy equipment of truck twin wheels and the like. It is so disposed as to contribute to the convenience in the operation for locating and removing work and is away from interference with the machine operation.

The guide 8 on the riser upward from the deck 4 mounts primary tool holder mounting 35 (Fig. 6). This primary mounting 35 has flanges 36 holding this primary tool holder mounting in position to be directed by the guide 8 in a plane toward and from the work holder. This direction is herein vertical and to the rear of the work holder and is effected by pair of extensions 37 through guide 8 of extension eyes 38 (Fig. 2) embracing nut 39 on threaded shaft 40 held against axial shifting and actuated by speed reduction 41 (Fig. 1) from motor 42. Manual shifting of this primary mounting of the tool holder may be effected from hand wheel 43 (Figs. 5, 6) on shaft 44 shiftable in slot 45 of the riser frame portion. This shaft 44 has thereon skew gear 46 in mesh with skew gear 47 on the nut 39. According to the direction of the rotation of the hand wheel 43 this primary mounting for the tool holder may be shifted toward or away from the work. This primary tool holder 35 carries guides 48 (Fig. 2) in which may be mounted secondary work holder 49 operable in the plane at right angles to the direction of travel effected by the adjustments from the shifting of the primary mounting 35. This operation of adjustment is effected by rotating hand wheel 50 (Figs. 5, 6) on shaft 51 having threads 52 for coacting with the primary mounting 35 in shifting this secondary mounting 49. Inasmuch as this shifting is in locating the tool radially as to the work, there is provided fixed point 53 (Fig. 6) and wheel carried graduations 54 to determine nicety of the amount of shifting that may be taken back and forth, which would be approximately radial shifting as against the shifting by the primary mounting 35 as axial as to the work.

Furthermore, on this secondary mounting 49 there is located tertiary mounting 55 (Figs. 3, 5, 6.) In this mounting 55 is shaft 56 having head 57 engaging the mounting 49. This shaft 56 on the side of the mounting 55 away from the mounting 49 has threaded portion 58 engaged by handle 59 serving to clamp and release this tertiary mounting from the secondary mounting in order that as released this tertiary mounting may swing on the shaft 56 as an axis. The amount of this shifting is readily determined by face plate or disk 60 fixed with the secondary mounting 49 and abutting disk 61 fixed with the tertiary mounting 55. The disk 61 has fixed point 62 and the disk 60 has graduations 63, desirably in degrees, for locating the angle in which the tool may be rocked or swung as to the axis of the work. This swinging is accordingly in a predetermined vertical plane as to which by the primary mounting 35 there may be shifting axially of the work as to the secondary mounting 49. There may be shifting transversely of the axis of the work or parallel to the plane of the wheel or drum, and as to the tertiary mounting 55 there may be swinging or rocking in such plane.

Carried by this tertiary mounting 55 is motor 64 (Fig. 1) having shaft 65 carrying pulley 66 having belt 67 to pulley 68 on shaft 69 having long sleeve and thrust bearing in sleeve 70 fixed with this tertiary mounting. With the shaft 65 on the opposite side of the shaft 56 from the shaft 69, the motor 64 to some extent in practice counter-balances the tool holder shaft 69, and the mass is accordingly more effectively steadied in its operating position. This shaft 69 in practice is desirably located at the working angle of say between 60° and 85° from the horizontal, and its lower terminus carries dressing, abrading or grinding wheel 71 desirably having beveled face 72. Arm 73 from the tertiary mounting 55 carries shield 74 for this grinding disk 71.

In locating this disk 71 as to the work, the operator may by handle 59 release this tertiary tool holder mounting 55 so that by engaging projecting arm 75 the tilt desired may be had either into or away from the work and then the handle 59 shifted into the clamp position.

In this set-up the work rotation as for the sleeve 11 is in practice effected at around 65 R. P. M. in a counterclockwise direction looking down on the drum. The grinding wheel is speeded up approximately two to one from the motor 64 and may have a rotation speed of 7000 in a direction looking down on the work clockwise or counter to the direction of travel of the drum. The location of the grinding wheel in this set-up is a greater distance from the plane of the guide 8 than the axis of the shaft 11 carrying the drum. This is of practical value in this operation, for as the grinding wheel or disk digs into the work and as the work moves theretoward in the reverse direction, any tendency of the wheel to drag or be flexed with the work is into a greater distance from the axis of the work and thus does not bind or grip in. This is a matter of great importance in the operation of this tool efficiently and against disturbance. This is a factor of course in effecting the concentric dressing of the drum, which dressing is a matter of progress determined by the operation of the motor 42.

Fixed with the primary tool mounting 35 (Fig. 5) is eye 76, through which extends rod 77 in its reciprocation directed by eyes 78, 79, fixed with the upright of the frame. Wing nut 80 adjusts collar 81 on the rod 77. As the motor 42 is effective in progressing the primary mounting 35 toward the work, thereby having the wheel or grinding disk effective in dressing the drum 26 inward from its outer free rim, the eye 76 works downwardly toward this collar 81 and in striking such moves this shaft 77 downwardly therewith, thereby causing yoke 83 as carried by this shaft to operate switch 84 in stopping the motor 42. It is then in order for the operator to effect the reverse travel by shifting the shaft 77 in the reverse direction, thereby cutting in switch 85 opposite the switch 84, which effects the reverse direction of operation of the motor 42 and is thus effective through a limit of lift for this grinding wheel until there be automatic stop as the eye 76 strikes collar 86 as in adjusted position by a wing nut 87. Accordingly, when this eye 76 strikes such collar, the motor 42 is stopped and there is discontinuance of the feed of the grinding disk upward whether such be in working backward on the drum or whether it be clearance to again feed down on the drum. These transits in and out are in a plane parallel to the axis of the sleeve 11 but shifted eccentric as to the direction of the shaft 69 in intersecting the axis of the sleeve 11 but (Fig. 12) off center, in practice say approximately ⅛ inch and more remote from the disk 71 than from the guide 8.

In the general set-up of the machine after the work has been placed, say through the swing arm and hoist and the tool has been located, the attendant may operate switch 88 (Fig. 5), which at once starts the motor 18 to rotate the work counter-clockwise and the motor 64 to operate the grinding tool or disk 71 clockwise. The hand wheel 50 and the arm 59 may be operated in locating the disk 71 in the desired operative position; the vertical position being taken care of either through the hand wheel 43 or by operating switch 89 to start motor 42 and then by hand shifting of the shaft 77 to act on the switches 84, 85, locating the vertical position therefor. As such starting position is determined preferably at the entrance side of the rim of the drum 26 and from the direction as inward or down, a control may be set as to the collar 81 for automatic stop of the motor 42. The diameter of the brake drum is taken care of by the hand wheel adjustment 50. As the feed is continued across the face of the drum in one direction there is the automatic stop for the operator to effect reversal of the direction of drive of the motor 42 either to lift the disk out or have it work outward on the drum.

In this set-up there is ready adaptation to different dimension wheels and drums with the wheels, the variance being in the axle-like element of the work mounting which may be effective in centering the work drum with the sleeve 11.

When the drum is on a live axle instead of the wheel, axle 90 may center on the sleeve 11 and have pin and lug transmission connection 21' therewith for drive, while the portion of the axle extending upward from drum 91 has axle terminus 92 extend through opening 93 (Figs. 7, 9) in bracket 94 mounted by clamps 95 with the guide 8. This will allow holding of the drum 91 against tilting because of the slip guide at the bracket 94 as brought into the desired adjusted position to take care of the rotating axle 90 as remote from the working wheel 71.

What is claimed and it is desired to secure by Letters Patent is:

A power tool embodying a rotary work holder for mounting and rotating a brake drum, a drum dressing tool holder, mounting means for rotating the tool holder on an axis inclined as to the axis of the drum and lying in a plane out of and parallel to the axis of the drum, said mounting means being adapted to adjust the tool holder axially and radially in said plane, and a drive rotating the work contacting portion of a tool in the tool holder against the direction of rotation of the brake drum.

HARRY K. BIGELOW.